United States Patent
Ebuchi

(10) Patent No.: US 7,584,242 B2
(45) Date of Patent: Sep. 1, 2009

(54) PRINTING CONTROL APPARATUS, SYSTEM AND METHOD

(75) Inventor: Kazuhisa Ebuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 10/300,589

(22) Filed: Nov. 21, 2002

(65) Prior Publication Data

US 2003/0103081 A1 Jun. 5, 2003

(30) Foreign Application Priority Data

Nov. 30, 2001 (JP) .............................. 2001-366874

(51) Int. Cl.
*G06F 15/16* (2006.01)

(52) U.S. Cl. ................ 709/203; 709/218; 709/249; 345/561; 358/1.1; 707/101

(58) Field of Classification Search ............... 709/203, 709/218, 249; 358/1.1, 1.15; 707/101, 201
See application file for complete search history.

(56) References Cited

U.S. PATENT DOCUMENTS

| | | | | |
|---|---|---|---|---|
| 6,453,268 B1 * | 9/2002 | Carney et al. | ............... | 702/186 |
| 6,614,549 B1 * | 9/2003 | Hlava | ......................... | 358/1.15 |
| 6,678,068 B1 * | 1/2004 | Richter et al. | .............. | 358/1.15 |
| 6,693,720 B1 * | 2/2004 | Livingston | .................. | 358/1.15 |
| 6,791,709 B1 * | 9/2004 | Nakamura et al. | ......... | 358/1.18 |
| 6,985,243 B1 * | 1/2006 | Matsueda | ................... | 358/1.15 |
| 2002/0021453 A1 | 2/2002 | Sakamoto et al. | | |
| 2002/0030848 A1 * | 3/2002 | Moriyama et al. | ......... | 358/1.15 |
| 2002/0046238 A1 * | 4/2002 | Estavillo et al. | ............. | 709/203 |
| 2002/0138564 A1 * | 9/2002 | Treptow et al. | ............. | 709/203 |

* cited by examiner

*Primary Examiner*—Saleh Najjar
*Assistant Examiner*—Thuong (Tina) T Nguyen
(74) *Attorney, Agent, or Firm*—Fitzpatrick, Cella, Harper & Scinto

(57) ABSTRACT

The printing system of the present invention enables the display of information to an operator indicating that printing has been halted even when it is the host computer that causes the halt in printing. When a print data preview is set, a print processor reads print data from a spool file, generates a preview image using a printer graphics driver and provides that preview image to a previewer. A status monitor then monitors and displays the status of a printer and the print processor.

15 Claims, 10 Drawing Sheets

PRINTING CONTROL APPARATUS, SYSTEM AND METHOD

FIELD OF THE INVENTION

The present invention relates to a printing control apparatus, system and method having the capability to monitor the print status where, for example, a printer is performing printing.

BACKGROUND OF THE INVENTION

In the process of a printer printing, it often happens that the print process is interrupted due to a paper jam at the start of printing, or a blank page is output because the printer has run out of ink. In such cases, it may be difficult for an operator to determine the cause of the problem simply by looking at the printer. Typically, the printer is equipped with a flashing LED or sounding buzzer indicating the occurrence of a paper jam, a lack of ink or some other error, in order to alert the operator of the cause of the problem. However, unless the operator either memorizes all the error patterns or refers constantly to the user's manual, the operator will be unable to understand what type of status error has occurred. In addition, as printers have become more powerful and sophisticated the types of statuses that must be monitored and the types of errors that must be detected have also increased, making it difficult to express all these different statuses by a simple pattern.

In order to cope with such a situation, a status monitor has been developed that uses two-way communication between the printer and the computer to update the operator graphically and in real time on the status of the printer.

There are a variety of ways of displaying the status of the printer on such status monitors. For example, the status monitor may itself communicate directly with the printer and display a status of the printer according to the information sent back from the printer. Or, with Microsoft's Windows® OS, it is possible to ascertain completion of a print job or the occurrence of an error in the printing apparatus through communication with a printing apparatus connected to the computer by IEEE 1284- or USB 1.1-compatible two-way communication established through execution of a process called language monitor, in a spool system that outputs print data from a spool, via this language monitor. The status monitor can obtain the information sent back from the printer via this language monitor and the status can be displayed.

However, in either case the statuses that the status monitor can display are limited by the information sent back from the printer.

Microsoft's Windows® is equipped with a function called a print processor for processing a data stream of print data. This print processor only performs certain processes, such as saving a data stream of print data created by a kernel module that graphically processes output such as display and printing like a GDI (Graphics Device Interface) or a printer driver to a storage medium and outputting the saved data stream of print data to a system (the GDI) or printing apparatus. The print processor can be equipped with a function that stops the data stream or that stops the data stream due to a query from the operator. In the event that a data stream of print data is stopped by this type of function provided in a print processor, the status monitor cannot obtain information on the status of the printer and accordingly also cannot display such status information.

In recent years, it has become possible to build a network printer system by connecting a plurality of client computers and print servers (server computers) and a printer via a network. In such a network printer system as well, for any given print job from a client, if for some reason the print processor of the print server stops the data stream as described above, other operators are unable to print out from the client computer. Yet this condition is not status information sent back from the printer, so the above-described status monitor of the client cannot notify the operator of this state.

Thus, as described above, when the cause for a print interruption lies not with the printer but the computer, there is no way for the operator to know the reason for the stoppage.

SUMMARY OF THE INVENTION

Accordingly, the present invention is proposed to solve the above-described problem of the conventional art, and has as its object to provide a printing control apparatus and method for enabling the cause of a malfunction to be displayed whenever printing is halted by the host computer, and particularly when a data stream of print data is stopped due to the operation of the print processor.

The above-described object of the present invention is achieved by a printing control system, comprising:

processing means for outputting print data to a printing apparatus, the processing means adapted to halt output of the print data and to respond with information on the status of a process in response to a status query; and status monitoring means for monitoring the status of the printing apparatus, receiving a response indicating the status of a process from the processing means and displaying the received process status.

Preferably, the printing control system further comprises preview display means for displaying a print preview image, wherein the processing means provides a preview image based on the print data to the preview display means, halts print data output while providing the preview image to the preview display means, and responds to a processing status query received while print data output is halted with information indicating that a preview is in operation.

Preferably, the processing means belongs to a server apparatus and the monitoring means belongs to a client apparatus, the server apparatus and the client apparatus being in operable communication with each other.

Preferably, the processing means belongs to a server apparatus, the monitoring means belongs to a first client apparatus and the preview means belongs to a second client apparatus, the server apparatus and the first client apparatus and the second client apparatus being in operable communication with each other.

Preferably, the status monitoring means belongs to a first user operating environment and the preview means belongs to a second user operating environment.

According to another aspect of the present invention, an information processing apparatus is operatively connected to a printing apparatus, the information processing apparatus comprising:

processing means for outputting print data to a printing apparatus, the processing means adapted to halt output of the print data and to respond with information on the status of a process in response to a status query; and status monitoring means for monitoring the status of the printing apparatus, receiving a response indicating the status of a process from the processing means and displaying the received process status.

According to yet another aspect of the present invention, a printing control apparatus comprises:

processing means for outputting print data to a printing apparatus, the processing means adapted to halt output of the print data and to respond with information on the status of a process in response to a status query; and status monitoring means for monitoring the status of the printing apparatus, receiving a response indicating the status of a process from the processing means and displaying the received process status.

According to yet another aspect of the present invention, a printing control system comprises:

output processing means for reading spooled print data and converting the print data into output data of a format that can be displayed or printed;

preview display means for displaying output data converted into a displayable format; and status monitoring means for querying the output processing means as to the status of a process and displaying information indicating that the output processing means is providing output data to the preview means when a response to that effect is received from the output processing means.

According to yet another aspect of the present invention, a printing control method comprises:

a processing step for outputting print data to a printing apparatus, the processing step adapted to halt output of the print data and to respond with information on the status of a process in response to a status query; and a status monitoring step for monitoring the status of the printing apparatus, receiving a response indicating the status of a process performed in the processing step, and displaying the received process status.

Preferably, the printing control method further comprises a preview display step for displaying a print preview image, wherein, in the processing step, a preview image based on the print data is provided to the preview display step, print data output is halted while the preview image is provided to the preview display step, and a processing status query, received while print data output is halted, is answered with information indicating that a preview is in operation.

Preferably, the processing step is executed by a server apparatus and the monitoring step is executed by a client apparatus, the server apparatus and the client apparatus being in operable communication with each other.

Preferably, the printing control method the processing step is executed by a server apparatus, the monitoring step is executed by a first client apparatus and the preview step is executed by a second client apparatus, the server apparatus and the first client apparatus and the second client apparatus being in operable communication with each other.

Preferably, status monitoring step is executed by a first user operating environment and the preview step is executed by a second user operating environment.

According to yet another aspect of the present invention, an information processing apparatus is operatively connected to a printing control apparatus, the information processing apparatus comprising:

processing means for outputting print data to a printing apparatus, the processing means adapted to halt output of the print data and to respond with information on the status of a process in response to a status query; and status monitoring means for monitoring the status of the printing apparatus, receiving a response indicating the status of a process from the processing means and displaying the received process status.

According to yet another aspect of the present invention, a printing control apparatus comprises:

processing means for outputting print data to a printing apparatus, the processing means adapted to halt output of the print data and to respond with information on the status of a process in response to a status query; and monitoring means for monitoring the status of the printing apparatus, receiving a response indicating the status of a process from the processing means and displaying the received process status in response to a status query from an information processing apparatus.

According to yet another aspect of the present invention, a printing control method comprises:

an output processing step of reading spooled print data and converting the print data into output data of a format that can be displayed or printed;

a preview display step of displaying output data converted into a displayable format; and a status monitoring step for querying the output processing means as to the status of a process and displaying information indicating that the output processing means is providing output data to the preview means when a response to that effect is received from the output processing means.

According to yet another aspect of the present invention, a computer program causes a computer to execute a processing routine and a status monitoring routine, the program comprising:

a processing module for outputting print data to a printing apparatus, the processing module adapted to halt output of the print data and to respond with information on the status of a process in response to a status query; and a status monitoring module for monitoring the status of the printing apparatus, receiving a response indicating the status of a process from the processing module and displaying the received process status.

Preferably, the computer program further comprises a preview display module for displaying a print preview image, wherein the processing module provides a preview image based on the print data to the preview display module, halts print data output while providing the preview image to the preview display module, and responds to a processing status query received while print data output is halted with information indicating that a preview is in operation.

Preferably, the operating system is adapted to provide independent operating environments for a plurality of users, the status monitoring module is executed by a first user operating environment and the preview module is executed by a second user operating environment.

According to yet another aspect of the present invention, a computer program causes a computer to execute a processing routine and a status monitoring routine, the program comprising:

a processing module for outputting print data to a printing apparatus, the processing module adapted to halt output of the print data and to respond with information on the status of a process in response to a status query; and a status monitoring module for monitoring the status of the printing apparatus, receiving a response indicating the status of a process from the processing module and displaying the received process status.

According to yet another aspect of the present invention, a computer program causes a computer to execute an output processing routine, a preview routine and a status monitor routine, the program comprises comprising:

processing means for outputting print data to a printing apparatus, the processing means adapted to halt output of the print data and to respond with information on the status of a process in response to a status query; and monitoring means for monitoring the status of the printing apparatus, receiving a response indicating the status of a process from the processing means and displaying the received process status in response to a status query from an information processing apparatus.

Preferably, in an operating system adapted to provide independent operating environments for a plurality of users, the status monitoring module is executed by a first user operating environment and the preview module is executed by a second user operating environment.

According to yet another aspect of the present invention, a computer program causes a computer operatively connected to a printing control apparatus to execute a processing routine and a status monitoring routine, the program comprising:

an output processing module for reading spooled print data and converting the print data into output data of a format that can be displayed or printed;

a preview display module for displaying output data converted into a displayable format; and a status monitoring module for querying the output processing module as to the status of a process and displaying information indicating that the output processing module is providing output data to the preview module when a response to that effect is received from the output processing module.

According to yet another aspect of the present invention, a computer-readable recording medium stores the computer program described above.

According to yet another aspect of the present invention, a printer driver comprises:

a print processor for performing printing and preview of print data stored in a spool file for storing print data provided from an application via a GDI; and a status monitor for displaying information indicating that the print processor is previewing print data when the print processor is previewing print data and for communicating with a printer and displaying a status sent back from the printer when the print processor is not previewing print data.

Preferably, in the printer driver as described above, when the print processor is performing a first computer preview, a status monitor of a second computer displays information indicating that a preview is in operation.

According to yet another aspect of the present invention, a preview method according to a printer driver comprises:

a preview display step of causing a status monitor to display information indicating a print data preview is in operation when a print processor for performing printing and preview of print data stored in a spool file for storing print data provided from an application via a GDI is previewing print data; and a status displaying step of causing the status monitor to communicate with a printer and displaying a status sent back from the printer when the print processor is not previewing print data.

Preferably, when the print processor is performing a first computer preview, a status monitor of a second computer displays information indicating that a preview is in operation.

According to these configurations, the status monitoring means and the processing means can communicate with each other. In the event that the data stream of print data is halted due to the operation of the processing means in tandem with some function, or even due to a request from the operator, that information is conveyed to the status monitoring means. The status monitoring means then displays that information for the benefit of the operator.

By providing a communication means between the status monitor and the print processor, it becomes possible to communicate internal processing statuses besides information that should be conveyed to the operator, so the status monitor, which is not directly inserted into the printing process, can ascertain internal processing status. In other words, in a printing system that basically processes sequentially, it is possible to strengthen the functions of a status monitor as a module capable of comprehensively monitoring the entire process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will be described in detail in accordance with the accompanying drawings.

First Embodiment

Figure 1:
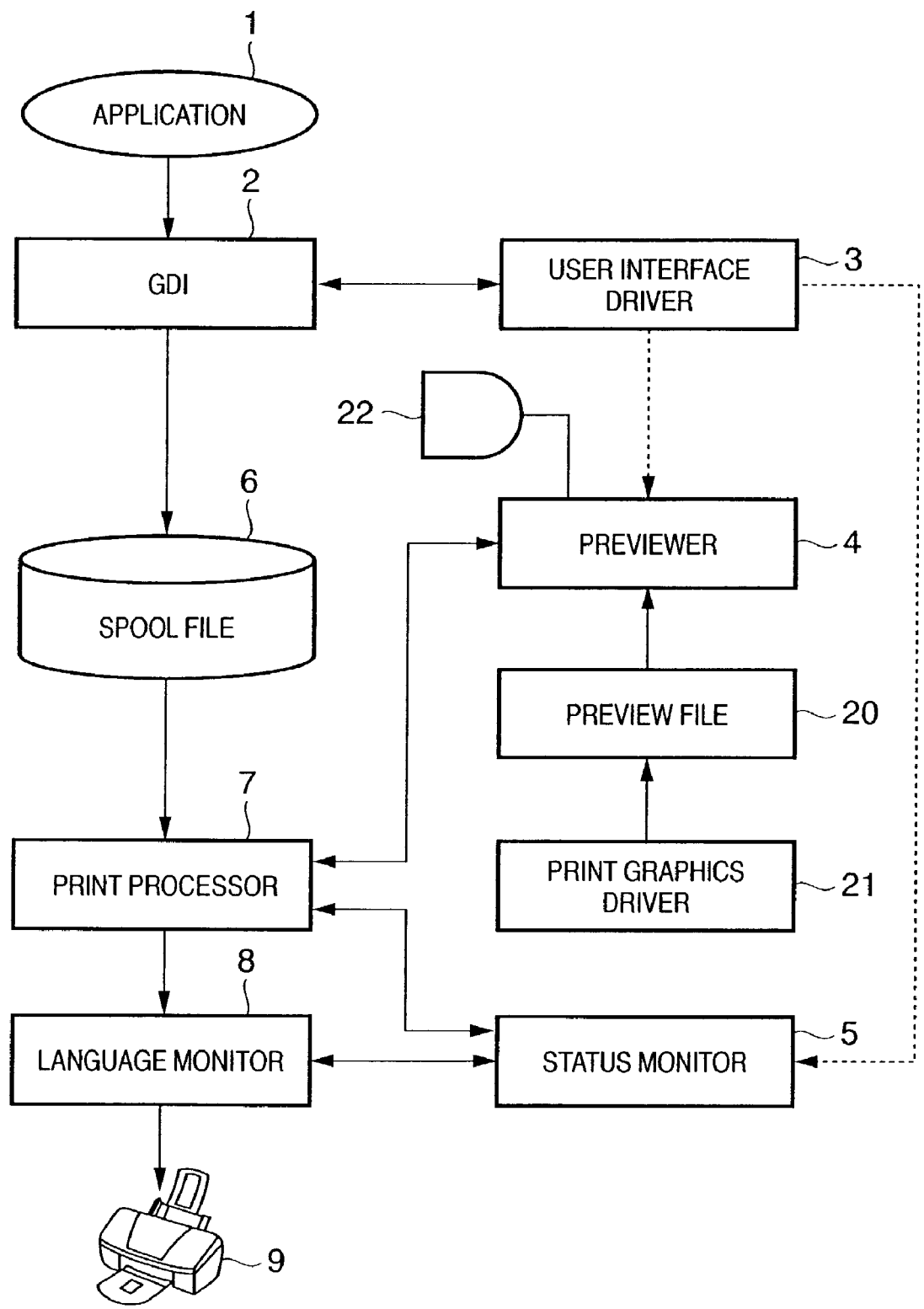
FIG. 1 is a block diagram of one embodiment of a local printing system according to the present invention.

FIG. 1 is a block diagram of the first embodiment of a local printing system according to the present invention.

The printing system depicted in FIG. 1 is equipped with a so-called preview function that displays an image of the data to be printed prior to printing. An application 1 is used to create a document and a printing system that includes an operating system GDI 2 is ordered to begin printing so as to print the document. When the GDI 2 receives notification from the application 1 to begin printing, the GDI 2 notifies a user interface driver 3 of a print event of commencement of printing by the application 1 (commence printing). The user interface driver 3, having received such notification, activates a previewer 4 and a status monitor 5.

Next, the application 1 supplies the print data of the document to be printed to the GDI 2 and continues printing. The print data, having passed through the GDI 2, is stored in a spool file 6. A print processor 7 then reads the print data from the spool file 6 and causes a printer graphics driver 21 to generate bit map data, and causes the previewer 4 to display the bit map data generated as a preview file 20 as a preview image on the display unit 22 while communicating with the previously activated previewer 4.

While the previewer 4 is preview displaying the bit map data on the display, and until an operator inputs a command to begin printing, the print processor 7 does not send print data to the downstream modules such as the language monitor 8. As a result, processing is temporarily stopped.

Figure 7:
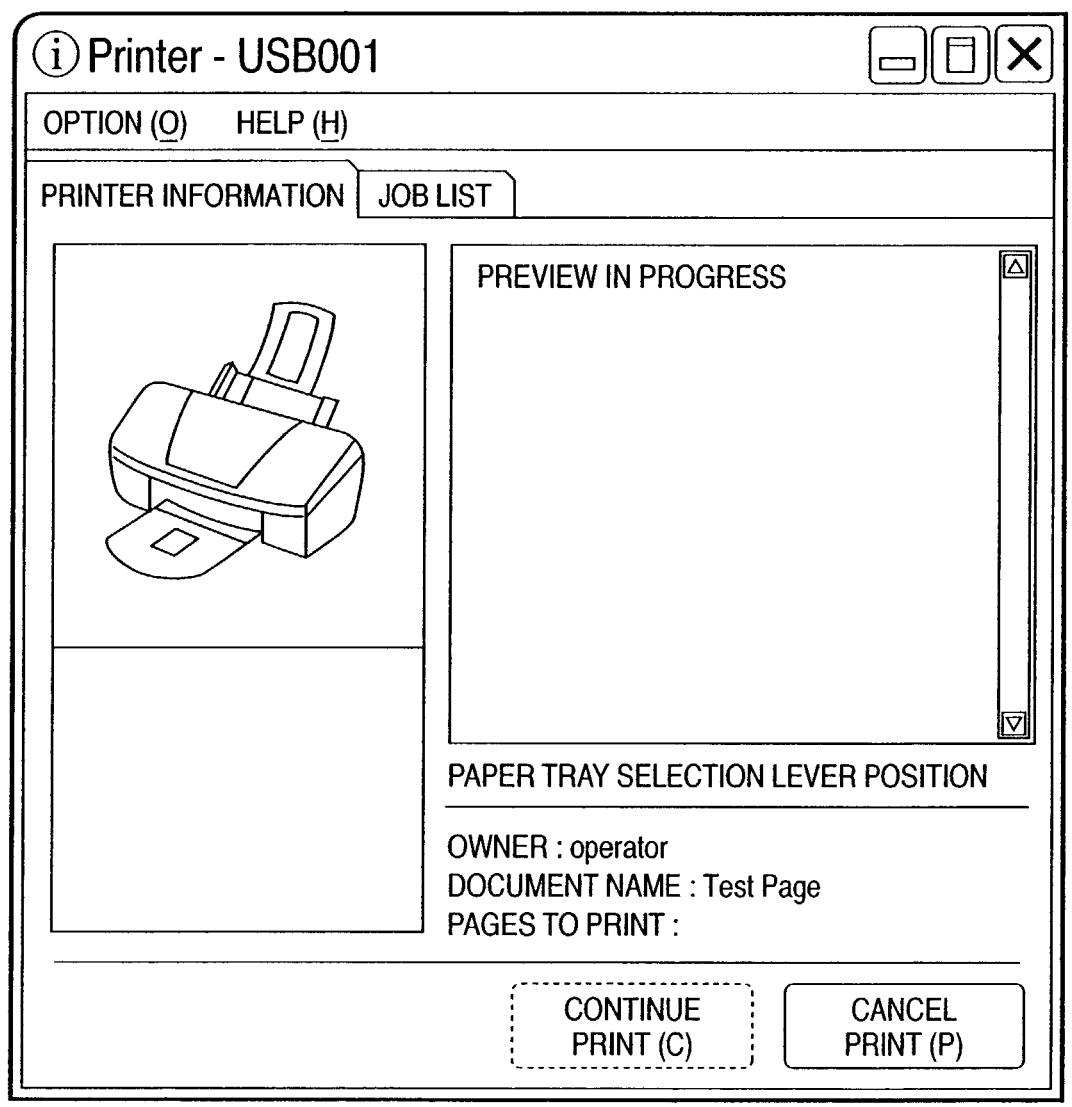
FIG. 7 shows a sample display of a status monitor according to the present invention.

The fact that the print processor 7 stops the flow of print data with the preview process is transmitted to the status monitor 5 together with the print job ID. The status monitor 5 then displays on the display for the operator to see the fact that a preview is being conducted for that particular job ID. A sample display of the status monitor 5 at this time is shown in FIG. 7. It should be noted that the application program provides the application 1, the operating system provides the GDI 2 and the printer driver provided by a manufacturer of the printer provides the user interface driver 3, the previewer 4, the status monitor 5, the print processor 7 and the language monitor 8.

A detailed description will now be given of the processes described above with reference to FIG. 8 and FIG. 9.

Figure 8:
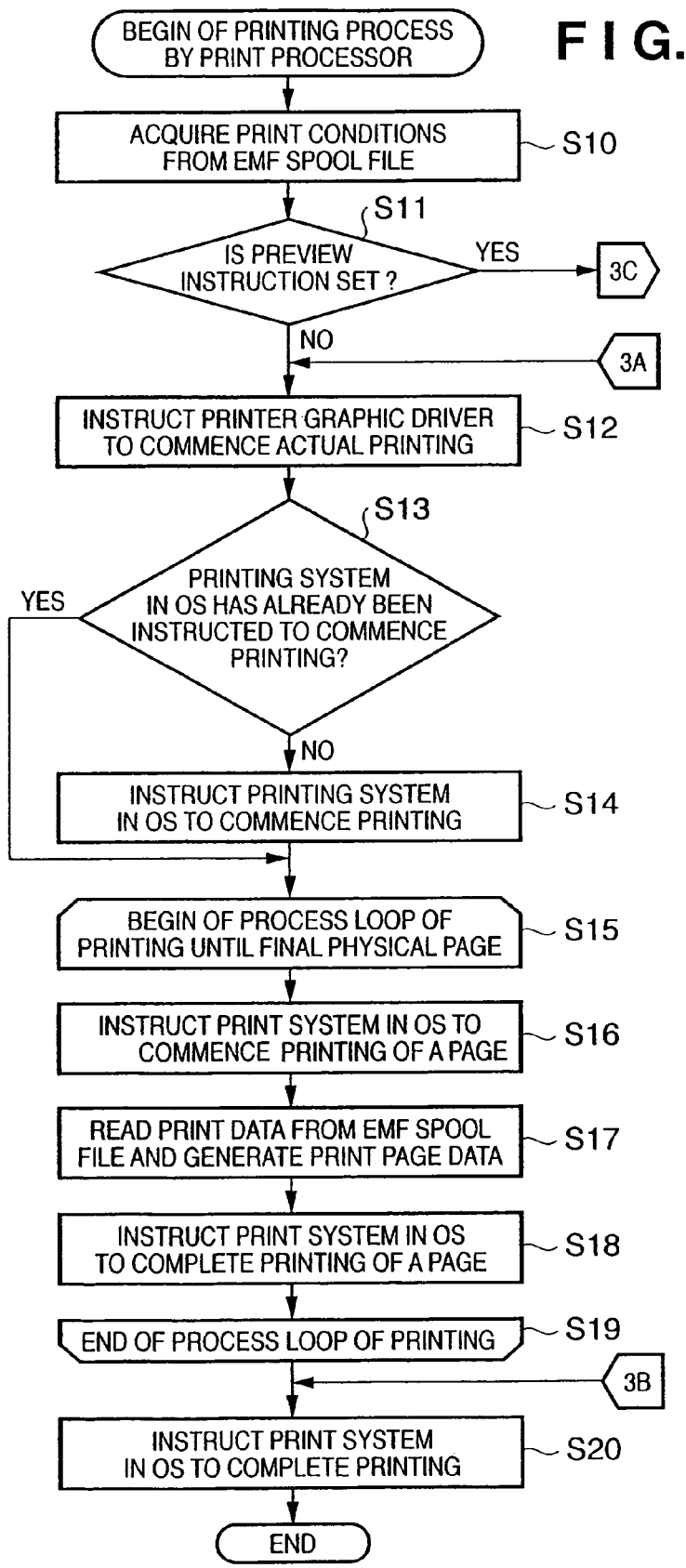
FIG. 8 is a flow chart showing steps in a process of printing a page according to one embodiment of the present invention.
Figure 9:
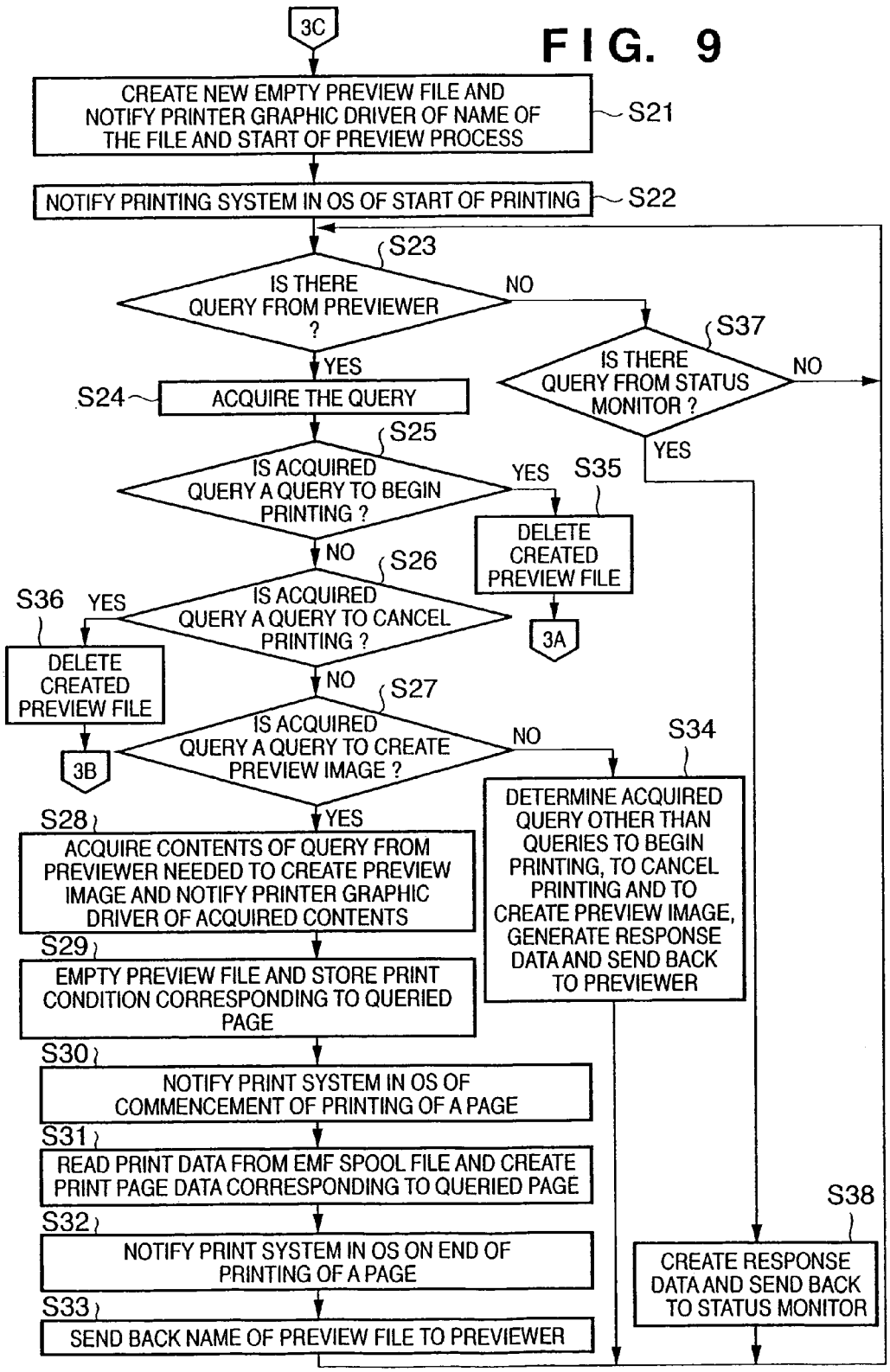
FIG. 9 is a flow chart showing steps in a process of printing a page according to another embodiment of the present invention.

FIG. 8 is a flow chart showing steps in a process of printing a page according to one embodiment of the present invention. FIG. 9 is a flow chart showing steps in a process of printing a page according to another embodiment of the present invention.

When the previewer 4 supplies the print processor 7 with a query for print image production or when the user interface driver 3 supplies the print processor 7 with a query to begin printing, the print processor 7 commences the routines depicted in FIGS. 8 and 9.

First, in a step S10, the print processor 7 acquires from the spool file 6 the print conditions for the print job stored together with the print data. In a step S11, the print processor 7 checks the print data to determine whether or not a preview instruction is set among the print conditions. If no preview instruction is set among the print conditions, the process proceeds to a step S12 in order to perform normal printing. If a preview instruction is set among the print conditions then the process proceeds to step S21 in order to perform the preview.

(Preview Process)

A detailed description will now be given of the preview process.

In step S21, a new and empty preview file 20 for storing the preview image and its associated print conditions is created, with the name of the file transmitted to the printer graphics driver 21.

Next, in a step S23, the print processor 7 awaits a query from the previewer 4. When there is a query, the process proceeds to a step S24 and the print processor 7 acquires the previewer 4 query. Here, a query can be expressed as a message of predetermined form for the purpose of communicating between steps. If there is no query from the previewer 4, the process proceeds to a step S37, where the print processor 7 determines whether or not there is a query from the status monitor 5. Queries from the status monitor 5 are limited to queries for status response. If there is a query from the status monitor 5, then in a step S38, the status at that time, that is, the in-preview operation status, is sent back to the status monitor 5.

If there is a query from the previewer 4, then in a step S25 the print processor 7 determines the nature of the previewer 4 query. If the query is a query to begin printing, then the process proceeds to step S35 in order to perform normal printing. If the query is not a query to begin printing, then the process proceeds to a step S26.

In step S35, the preview file 20 created in step S21 is deleted and the process proceeds to step S12 in order to perform normal printing.

In step S26, the print processor 7 determines the nature of the query from the previewer 4. If the query is a query to cancel a print job, then the process proceeds to a step S36, where the printing of the print job is terminated. If the query is not a query to cancel a print job, then the process proceeds to a step S27.

In step S36, the preview file 20 created in step S21 is deleted and the process proceeds to a step S20, where the printing of the print job is terminated.

In step S27, the print processor 7 determines the nature of the query from the previewer 4. If the query is a query to create a preview image, the process proceeds to a step S28 and a preview image is created. If the query is not a query to create a preview image, then the process proceeds to a step S34 and some other query is processed.

In step S34, the print processor 7 processes previewer 4 queries other than commence print queries, cancel print queries and create preview image queries. Thus, for example, in response to a status query regarding how many pages can be printed, the print processor 7 may prepare all the pages as a reply to the previewer 4. Or, for example, in response to a query as to whether or not application 1 print data is in the spool or not, the print processor 7 may prepare a flag indicating whether or not the print data is in the spool as a reply to the previewer 4. The print processor 7 may execute other processes as appropriate in response to queries and queries from the previewer 4.

In step S28, the print processor 7 acquires the contents of the query from the previewer 4 and obtains the information needed to create a preview image. Here, the type of query relayed from the previewer 4 may for example be the page number of the print page data to be created by the print processor 7, or the number of vertical and horizontal pixels in the preview image to be created, or the resolution at the time the preview image is created, or the number of colors used in the preview image to be created or a method of eliminating color. Of course, the query may consist of any one of the above types of information or a combination of these types. However, the page number is required. The type of query so acquired is then relayed to the printer graphics driver 21.

In a step S29, after the contents of the preview file 20 have been deleted, the print conditions corresponding to print page data of the required page number are stored in the preview file 20.

In a step S30, the print processor 7 notifies the OS printing system (GDI 2) that printing of a single page is beginning.

In a step S31, the print data is read from the spool file 6 and print page data of the page number queried by the previewer 4 is created and transferred to the GDI 2.

In a step S32, the print processor 7 notifies the printing system (GDI 2) in the OS that printing of a single page is completed. Here, the GDI 2 creates a graphic draw command from the print page data and relays the command to the printer graphics driver 21. The printer graphics driver 21 then creates a bit map image from the graphic draw command received from the GDI 2 which the printer graphics driver 21 then adds to the preview file 20 as the preview image.

In a step S33, the file name of the preview file 20 is supplied in response to a preview image creation query from the previewer 4. The process then proceeds to step S23, where the next query from the previewer 4 is awaited. If there is some query from the previewer 4, then processes previously described are performed according to the type of query.

(Printing Process)

A description is now given of the printing process according to the present invention.

Meanwhile, in step S12, in order to print, the printer graphics driver 21 is instructed to commence actual printing.

In step S13, it is determined whether or not the printing system (GDI 2) has already been instructed to commence printing. If so, then the process proceeds to a step S15 to print the pages. If not, then the process proceeds to a step S14 and the printing system is instructed to commence printing.

The steps from step S15 to step S19 form a loop for printing the physical pages to be printed. In step S19, if printing of all the designated physical pages is not complete, then the process of printing the physical pages continues to step S16. After printing of all the designated printed pages is complete the process proceeds to step S20 and the printing system (GDI 2) is notified that printing is completed.

In a step S16, the printing system (GDI 2) is instructed to commence printing of a single page.

In a step S17, the print data is read from the spool file 6 and print page data corresponding to the physical pages is created.

In step S18, the printing system (GDI 2) is notified that printing of a single page is completed. Here, the GDI 2 creates a graphic draw command from the print page data and sends the command to the printer graphics driver 21. The printer graphics driver 21 then generates a bit map image from the graphic draw command from the GDI 2 and supplies the bit map image to the printer 9.

In step S20 the printing system (GDI 2) is notified that printing is completed, and there the process terminates.

The printer 9, when it receives the data, prints an image based on the data received.

As described above, the process of printing a page by the print processor 7 shown in FIGS. 8 and 9 is completed. In step S32, each time the print processor 7 creates print page data and informs the GDI 2 that page printing is completed, the GDI 2 generates a graphic draw command from the print page data and transfers the graphic draw command to the printer graphics driver 21. The printer graphics driver 21 then generates bit map data from the graphic draw command received from the GDI 2, and the bit map data so created is added to and stored in the preview file 20 specified from the print processor 7.

The previewer 4 obtains a preview image of the designated page number from the preview file 20 having the filename sent back in response from the print processor 7 in step S33.

In addition, in step S18, each time the print processor 7 creates print page data and notifies the GDI 2 that printing of a single page is completed, the printer graphics driver 6 notified in step S12 of the actual printing process generates bit map data from the print page data, converts the bit map data into a print command, and the physical page supplied to the printer 7 via a predetermined data transmission process not shown in the diagram is printed. It should be noted that if the printer graphics driver 6 can generate a plurality of types of print data, then it is not necessarily the case that print data is generated from the bit map type and print data can be generated from a predetermined type of page description language.

It should be noted that, in the event that there is a status query from the status monitor during printing, in FIG. 9., for example during the loop from steps S15 through steps S19, a response can be given to such query by adding a step that tests for the presence of a status query from the status monitor 5 in the same region as step S37 of FIG. 9 as well as a step that responds to the status monitor 5 that printing is in progress in the region of step S38 of FIG. 9 when there is a status query. Of course, if there is no status query, then the process loop is continued.

In the present embodiment, the printer graphics driver generates the bit map data, which the printer graphics driver then supplies to the printer. Alternatively, the printer graphics driver may generate printer-processible page description language print data to be supplied to the printer.

(Operation of Status Monitor)

A description will now be given of the operations performed by the status monitor.

Figure 2:
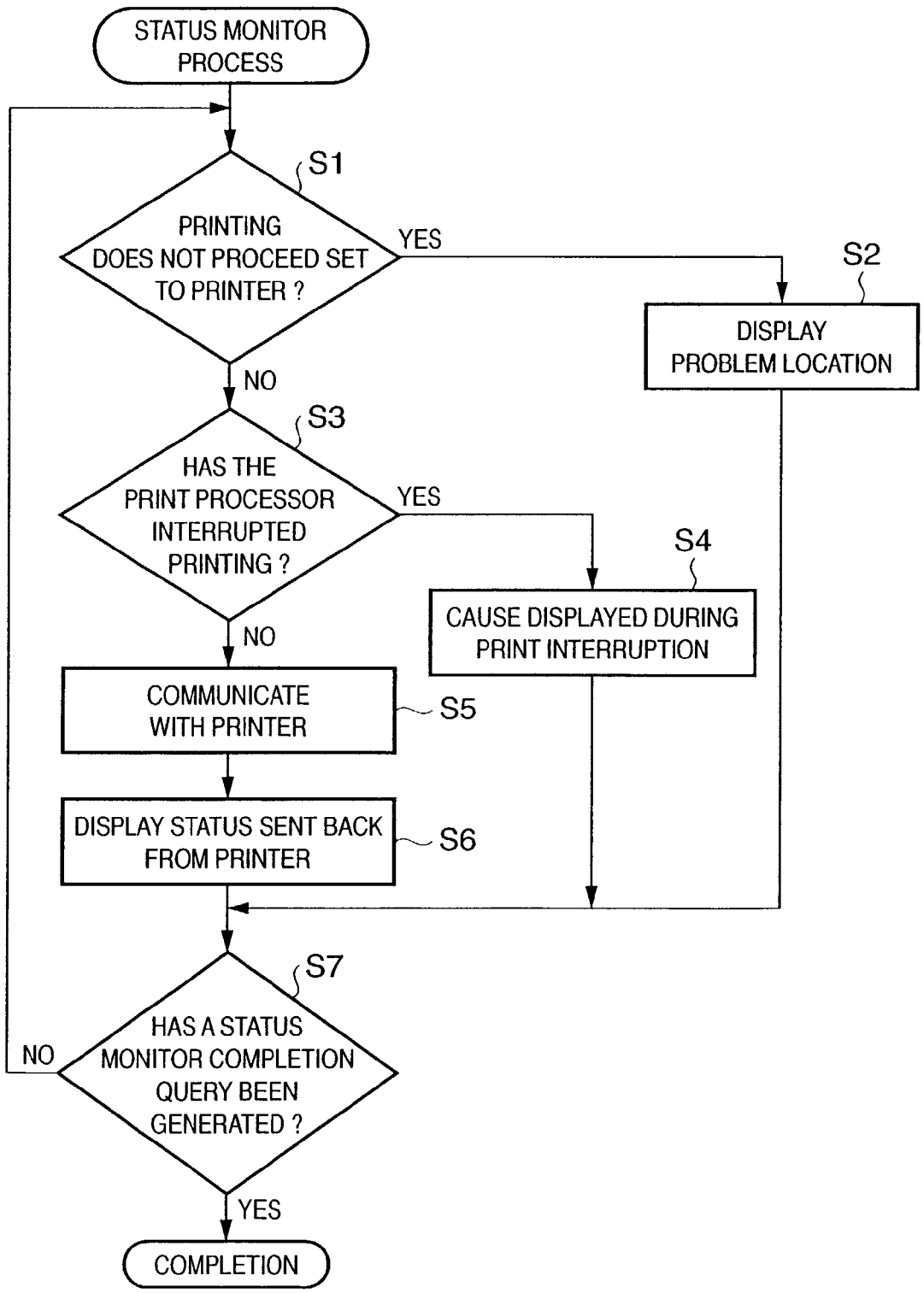
FIG. 2 is a flow chart showing the basic operations of a status monitor according to the present invention.

FIG. 2 is a flow chart showing the basic operations of a status monitor according to the present invention.

In a step S1, the status monitor 5, which is activated from the user interface driver, checks whether the printing system as a whole is set to carry out printing. In a step S2, if the printer is off line or if the system as a whole is interrupted, then the status monitor 5 informs the user by displaying a message to that effect using the text line data or image data previously stored in a storage device.

If in step S1 no problem can be found with printing, then in a step S3 status monitor 5 communicates with the print processor 7 and submits a status query to the print processor 7 and receives from the print processor 7 the status thereof. Here, if the print processor 7 informs the status monitor 5 that a preview process is in progress as in step 38 in FIG. 9, then the preview function causes printing to stop, so in a step S4 a message to that effect is displayed to the operator as shown in FIG. 7. If printing is not stopped by the print processor 7, then the process proceeds to a step S5.

If no temporary halt to the printing caused by the print processor 7 is detected in step S3, then in step S5 the status monitor 5 communicates with the printer. As shown in the example in FIG. 1, communication may also take place via the language monitor 8. After acquiring status information from the printer, in a step S6 the status monitor 5 analyzes the status information, determines the status to be displayed to the operator and then provides that display using the text line data or image data previously stored in the storage device.

A description will now be given of the hardware configuration of the printing system.

Figure 10:
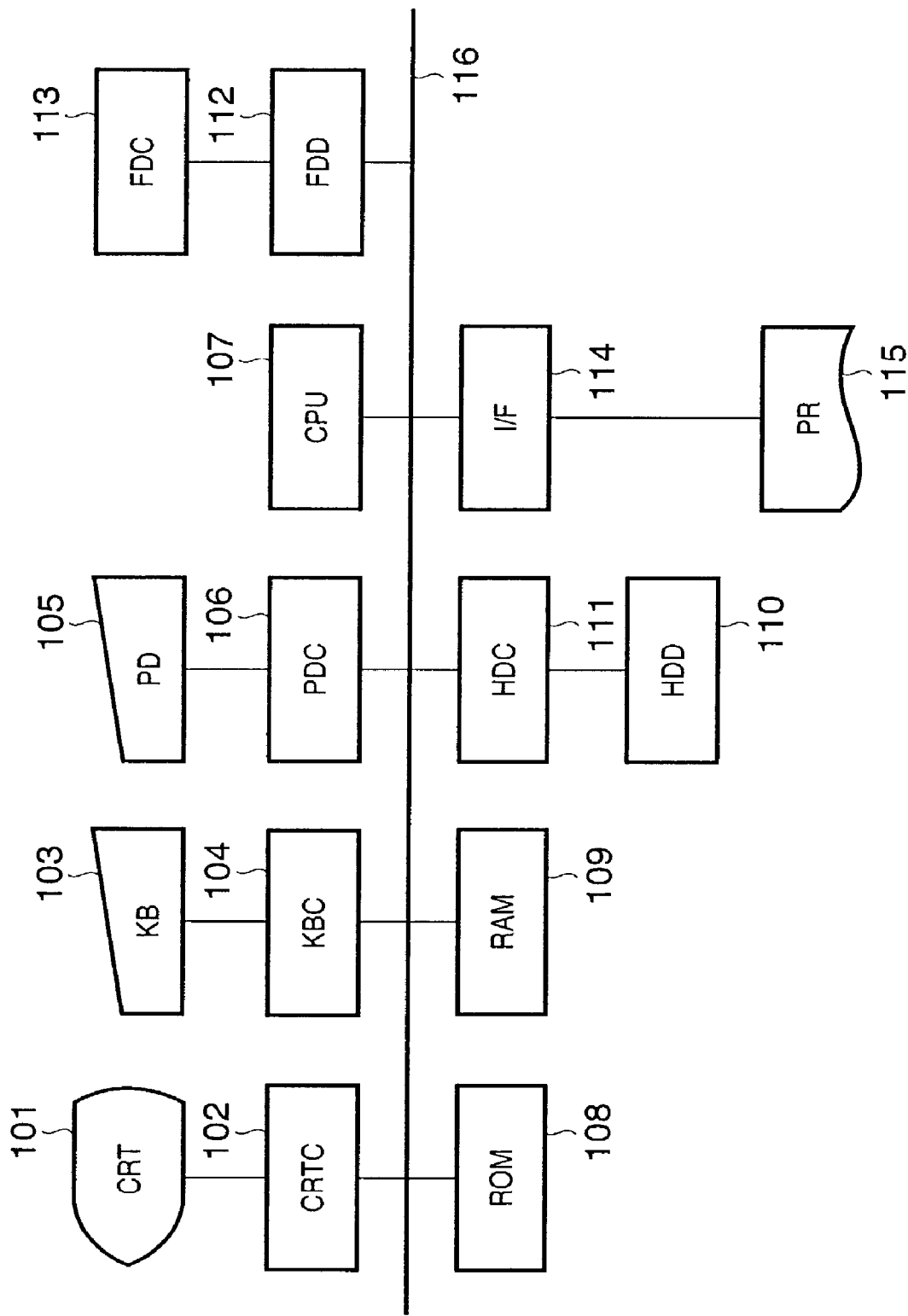
FIG. 10. is a hardware block diagram of the printing system according to the present invention and a diagram of the structure of a printing system according to one embodiment of the present invention.

FIG. 10. is a hardware block diagram of the printing system according to the present invention and a diagram of the structure of a printing system according to one embodiment of the present invention.

In FIG. 10, a CRT display device 101 corresponds to the display unit 22 of FIG. 1. The status monitor 5 displays status displays screen like that shown in FIG. 7 on the CRT display device 101. The CRTC 102 is a display unit controller. The user interface screen is displayed on the CRT 101.

A keyboard or other, similar data input device 103 can also set the print conditions, via (for example) the user interface driver shown in FIG. 1. Reference numeral 104 is a keyboard controller.

The pointing device 105 can also halt printing, via (for example) the previewer user interface. A pointing device controller 106 controls the pointing device 5.

A CPU 107 performs control of the apparatus as a whole. The steps shown in the flow charts of FIGS. 2, 8 and 9 are carried out by execution of a program for the purpose of executing those steps.

The ROM 108 stores programs such as a boot program and data.

The RAM 109 stores the OS, the application programs, and the programs for the user interface driver, the print processor and the printer graphics driver relating to the steps shown in the flow charts of FIGS. 2, 8 and 9, and can also be used as a work area.

The hard disk drive 110 records the OS, the application programs, the printer driver programs including the programs related to the steps shown in the flow charts of FIGS. 2, 8 and 9, and the font data, and moreover, also records the data files (preview files) and EMF spool files. The hard disk controller 111 controls the hard disk drive 110.

The floppy disk drive 112 is a drive device for a removable storage medium. A floppy disk controller 113 controls the floppy disk drive 112.

The interface 114 is connected to a printing device 115 such as a printer via an interface cable.

The devices are connected to each other by a bus 116.

When power is supplied to the main unit, the CPU 107 is activated in accordance with the boot program stored in the ROM 108, loads the OS from the hard disk drive 110 and is readied for the operator's input. If the operator inputs an instruction to print or an instruction to change the print settings of the printer driver from the keyboard 103 or the pointing device 105 via the application, then the printer driver program stored in the hard disk drive 110 is loaded into the RAM and executed. The configuration shown in FIG. 1 can be achieved by executing a commercially available operating system in addition to the configuration shown in FIG. 10 and the program shown in FIGS. 2, 8 and 9.

Effects of the First Embodiment

As described above, the local printing system of the present embodiment makes it possible to display the fact that the preview function is in operation via the status monitor 5. In so doing, it becomes possible to strengthen the capabilities of the status monitor as a module that comprehensively displays a variety of states related to the printing process for the benefit of the operator.

Second Embodiment

A description will now be given of a second embodiment of the present invention.

As described above, the first embodiment of the present invention concerned the operation of the status monitor 5 in a local printer. However, in the present embodiment, a network connects the client computer 301 and the server computer 302 to each other. Accordingly, messages transmitted between the client computer 301 and the server computer 302 are transmitted via this network.

Figure 3:
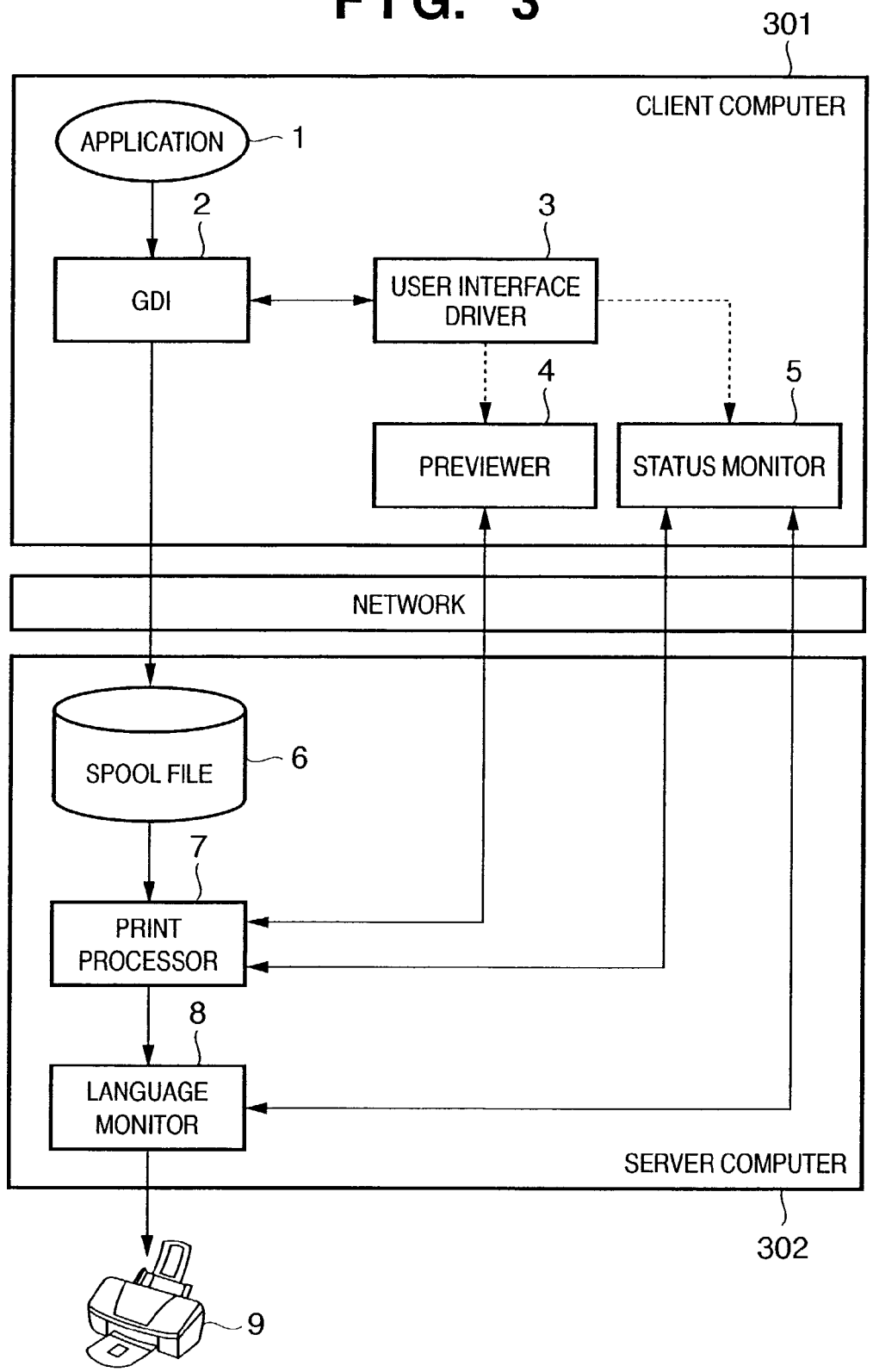
FIG. 3 is a block diagram of one embodiment of a network printing system according to the present invention.

FIG. 3 is a block diagram of is a block diagram of one embodiment of a network printing system according to the present invention.

An application 1 operating at the client computer 301 creates a document and directs the printing system of the operating system to begin printing in order to print the document created. Here, the GDI 2 notifies the user interface driver 3 of a print event, that is, of the commencement of printing by the application 1. The user interface driver 3 then activates the previewer 4 and the status monitor 5.

Next, the application 1 supplies the document print data to the GDI 2 and continues the printing process. The print data is then stored in the spool file 6 of the server computer 302, and the print processor 7 that operates at the server computer 302 reads the print data so stored, after which the print processor 7 causes the printer graphics driver to generate bit map data and, while communicating with the client computer 301 previewer 4 activated previously, causes the previewer 4 of the client computer 301 to display the generated bit map data.

While the previewer 4 is displaying the bit map data on the display unit (that is, providing a preview image), the server computer print processor 7 does not send data to downstream devices such as the language monitor 8 until and unless the operator issues an instruction to commence printing, so printing is temporarily halted.

Here, the fact that the print processor 7 of the server computer has stopped the flow of data via the preview process is relayed to the client computer status monitor 5 together with the print job ID and the like, and the status monitor 5 then displays a message for the operator on the client computer display unit to the effect that a preview process is in progress for that particular job ID.

The basic operations of the status monitor 5 are the same as those described in the flow chart of FIG. 2 used to describe the first embodiment. However, the print processor and language monitor, which communicate with each other, operate at the server computer. The print processor 7 executes the process steps depicted in FIGS. 8 and 9 used to describe the first embodiment, by which the printing system of the present embodiment is achieved.

Effects of the Second Embodiment

The present embodiment makes it possible to display, on the status monitor 5, the fact that a preview operation is in progress in a network printing. In so doing, it becomes possible to strengthen the capabilities of the status monitor as a module that comprehensively displays a variety of states related to the printing process for the benefit of the operator.

Third Embodiment

A description will now be given of a third embodiment of the present invention.

In a network printer, in actuality a case like the following would appear most useful.

Figure 4:
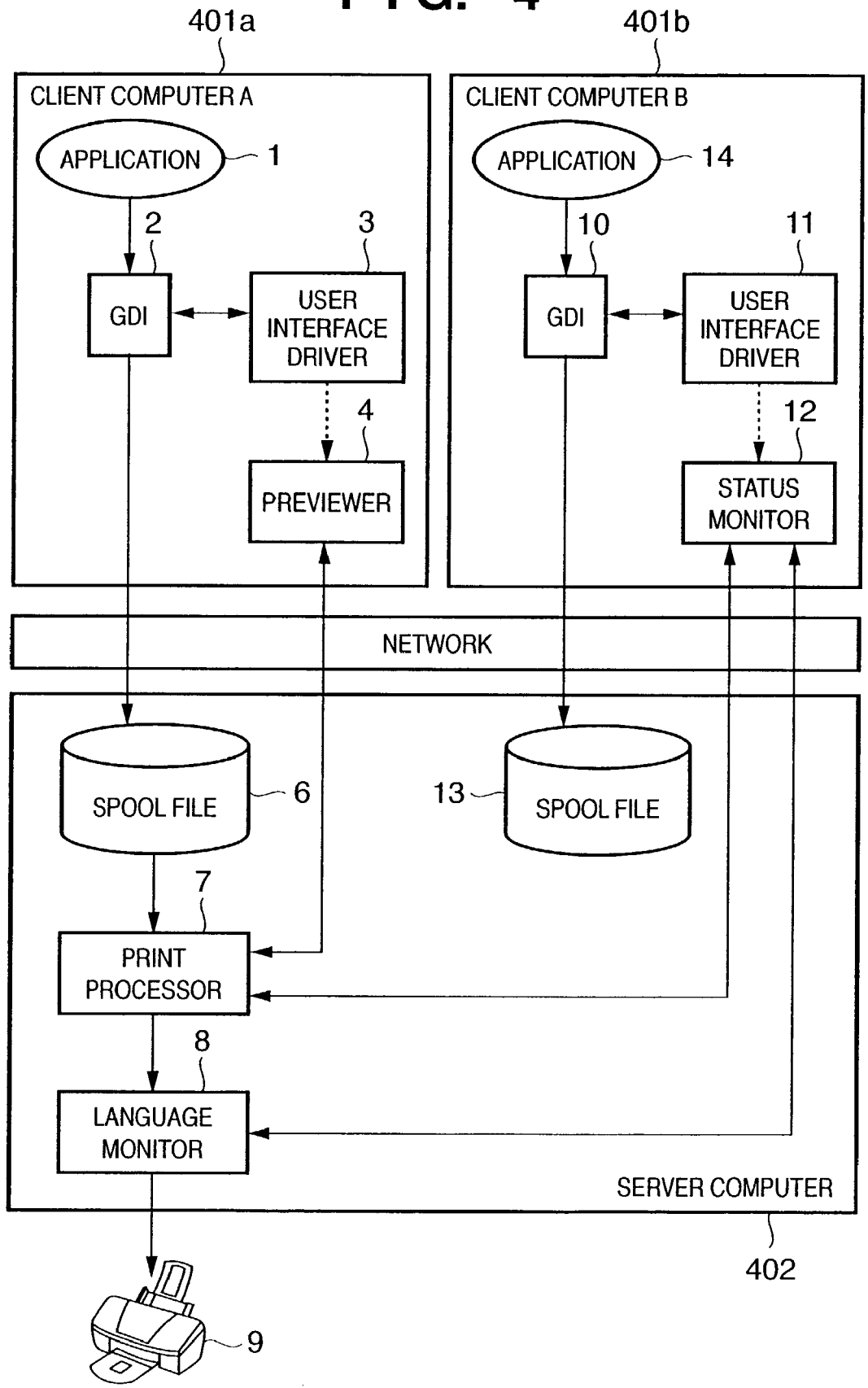
FIG. 4 is a block diagram of one embodiment of printing from a plurality of client computers, in a network printing system according to the present invention.

FIG. 4 is a block diagram of one embodiment of printing from a plurality of client computers, in a network printing system according to the present invention. The network is configured by connecting client computer A (401a) and client computer B (401b) and server computer 402 to each other.

When the client computer A prints in the same manner as does the client computer 301 of the second embodiment, the server computer 402 print processor 7 temporarily halts processing of print data, so printing does not proceed even if printing is carried out from the client computer B application 14. However, the status monitor 12, which is activated from the user interface driver 11 of the client computer B, communicates with the print processor 7 of the server computer 402 and the print processor 7 then acquires, together with the print job ID, information to the effect that the flow of print data has been stopped by the preview process. The status monitor 5, having received this information, then displays a message for the operator on the client computer display unit to the effect that a preview process is in progress for that particular job ID, thus enabling the operator of the client computer 301 to grasp the reason for the temporary halt in printing.

In the present embodiment as well, the status monitor 12 executes the steps shown in FIG. 2 and the print processor 7 executes the steps shown in FIGS. 8 and 9. As a result, by an identical technique the first embodiment and the second embodiment both make it possible for the status monitor 12 of the client computer B to display the fact that the print processor 7 is previewing and that printing has been halted. It should be noted that, although omitted here, the client computers, like the client computer 301 in FIG. 3, are each equipped with both a previewer and a status monitor.

Effects of the Third Embodiment

With the present embodiment, in a network printing arrangement in which a client B operator tries to print while a client A operator is using the preview function, the fact that printing does not proceed because the preview function is being used is communicated to the client B operator. Whereas conventionally the client B operator was unable to know the reason why printing was not progressing, the present embodiment makes it possible for the client B operator to know the reason by displaying a status. In response to the displayed status, the client B operator can choose an action such as waiting for the client A operator's preview to terminate, leading the client A operator to terminate the preview or canceling the client B operator's print job for that printer and issuing the print job to another printer.

It should be noted that, in the printing of the present invention, not only client computer A but also when, at the server computer, the operator prints as with the first embodiment described above, the client computer B status monitor communicates with the server computer print processor so as to inform the client computer operator that there is a temporary halt to printing due to a preview at the server computer.

Similarly, when printing from the client computer as with the second embodiment described above, the server computer status monitor communicates with the print processor so as to inform the server computer operator that there is a temporary halt to printing due to a preview at the client computer.

Furthermore, in the present embodiment, when, in a network printing, either the server operator (or the client operator) is using the preview function and the client (or the server operator) attempts to print, the client operators belonging to this network printing system and the server operator are able to understand that printing does not proceed because the preview function is being used. Whereas conventionally the client operator (or the server operator) was unable to know the reason why printing did not progress, the present embodiment makes it possible for the server operator to know the reason by displaying a status. In response to the displayed status, the server operator can choose an action such as waiting for the client operator's preview to terminate, leading the client operator to terminate the preview or canceling the server operator's print job for that printer and issuing the print job to another printer.

Fourth Embodiment

A description will now be given of a fourth embodiment of the present invention, with reference to FIG. 5.

In the Windows® operating system, there is a way to configure a network printer system by designating the output called Add Port. This type of configuration differs from the network system of the second embodiment insofar as the server computer and the client computer printing processes are independent of one another, and the print processor operates at each of the computers.

Figure 5:
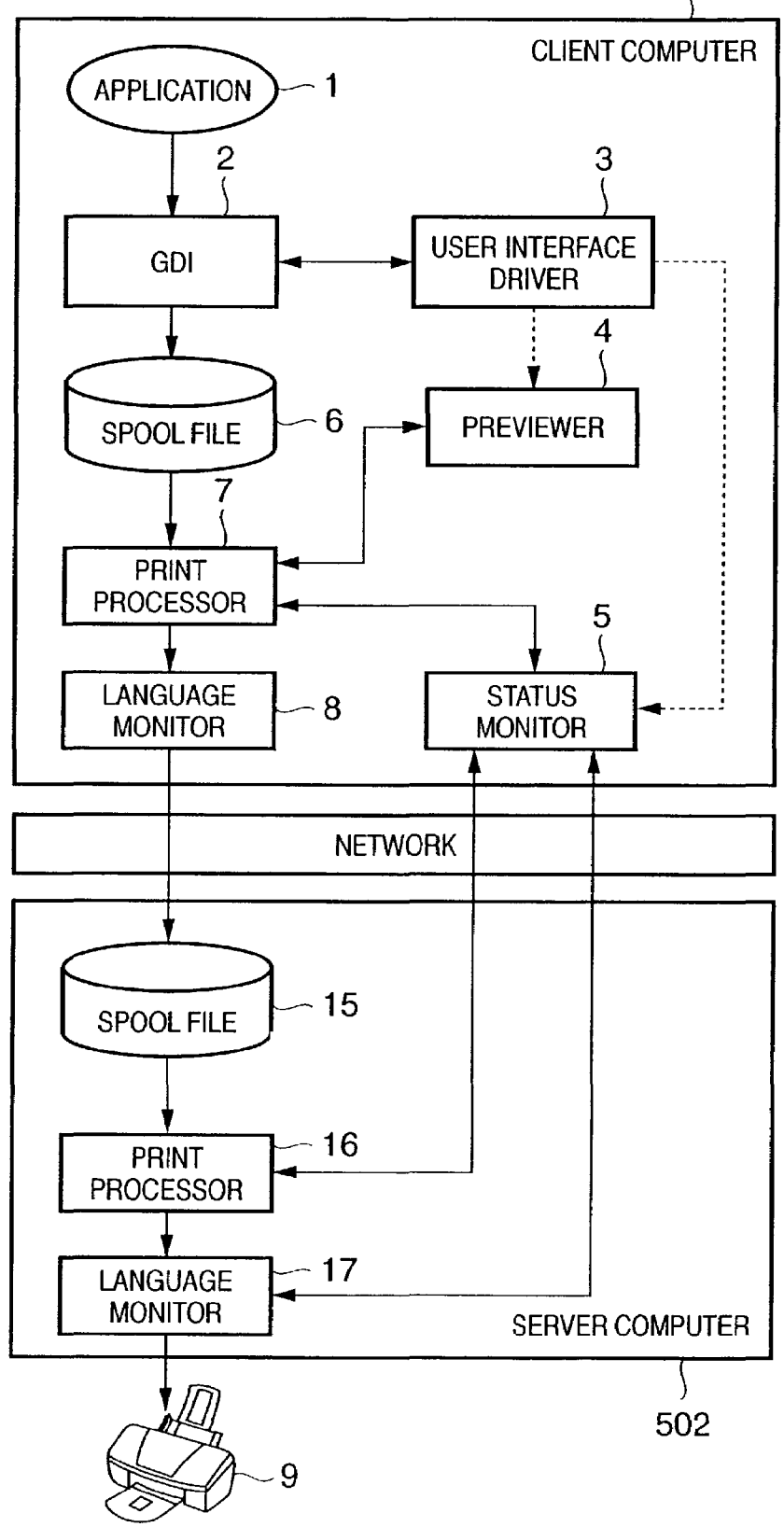
FIG. 5 is a block diagram of one embodiment of network architecture employing an Add Port, in a network printing system according to the present invention.

FIG. 5 is a block diagram of one embodiment of network architecture employing an Add Port, in a network printing system according to the present invention.

In a network created by Add Port connection, a printing process within the client computer 501 is considered a printing process for a so-called local printer. However, in order for the status monitor 5 of the client computer 501 to obtain the status of the printer 9, it is necessary to communicate not with the same client computer 501 language monitor 8 (or printer) but with the server computer 502 language monitor 17 (or printer), and a status monitor 5 mounting such a mechanism that is already commercialized. Even where the server computer 502 print processor 16 temporarily halts printing due to a preview from the client computer, it is possible to notify the operator to that effect by the status monitor 5 and the print processor 16 communicating with each other.

In addition, when performing a preview like that of the first embodiment at the client computer 501, even when printing has been temporarily halted before print data is sent to the server computer 502 it is still possible to notify the operator by setting the client computer 501 status monitor 5 so that it communicates with the print processor 7 inside the same client computer 501.

In the present embodiment as well, the status monitor 5 executes the steps depicted in FIG. 2 and the print processor 7 executes the steps shown in FIGS. 8 and 9. As a result, by a technique identical to that of the first embodiment, the present embodiment makes it possible for the status monitor 5 of the client computer 501 to display the fact that the print processor 7 of the client computer 501 is previewing and that printing has been halted.

Effects of the Fourth Embodiment

With the present embodiment, in a network printing by the Add Port, it is possible to display on the status monitor the fact that a preview is in progress without querying the client computer. In so doing, it becomes possible to strengthen the capabilities of the status monitor as a module that comprehensively displays a variety of states related to the printing process for the benefit of the operator.

Fifth Embodiment

A description will now be given of a fifth embodiment of the present invention, with reference to FIG. 6.

Microsoft's Windows XP® expands the conventional Terminal Server function and provides individual application execution environments (sessions) for a plurality of operators using a single computer at the same time. However, the printing system is not executed individually, and only one operates for the plurality of users, so while one operator is previewing the print processor temporarily halts printing and no other operator can print.

Figure 6:
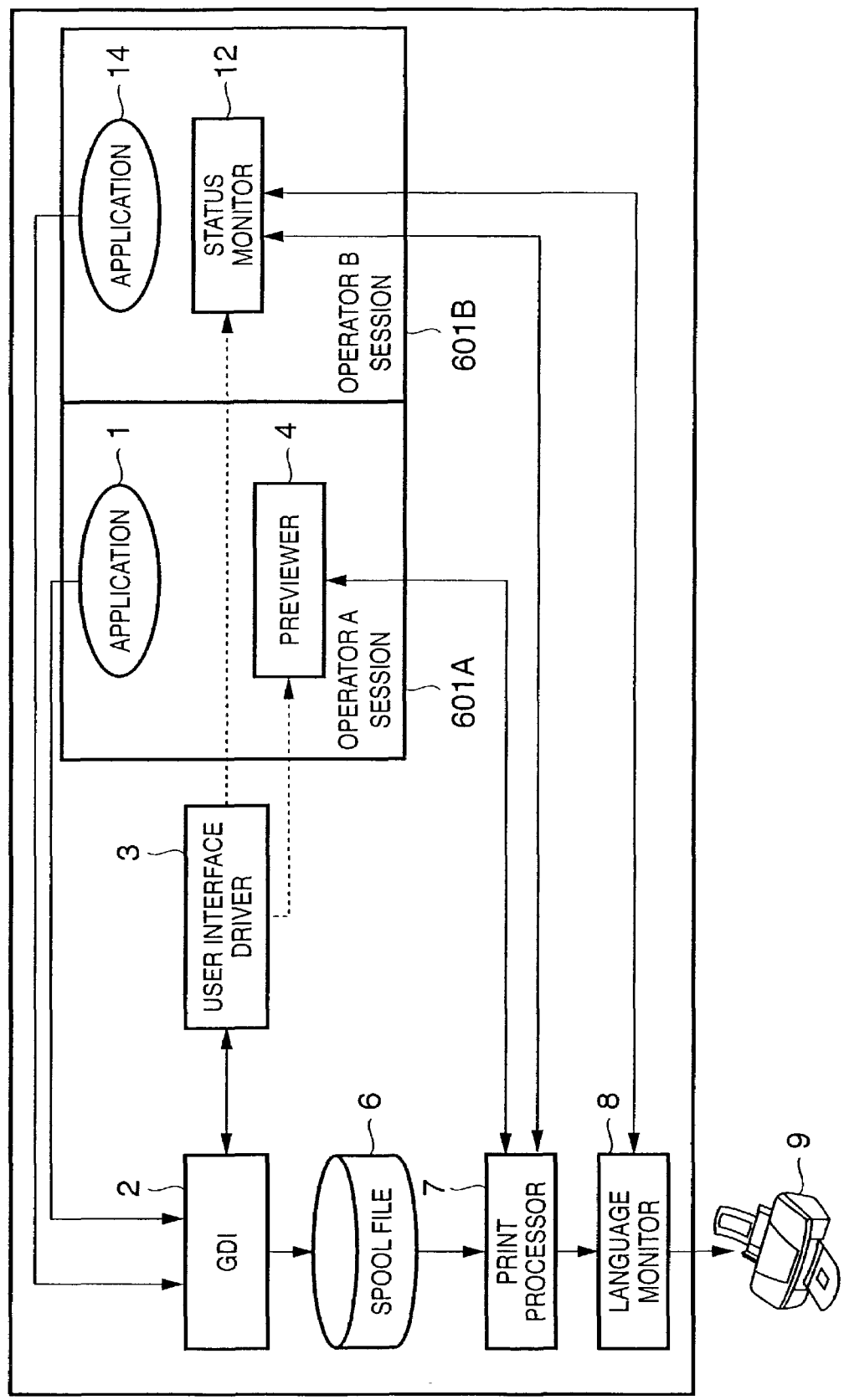
FIG. 6 is a block diagram of one embodiment of the printing system of the present invention using Windows XP®.

FIG. 6 is a block diagram of one embodiment of the printing system of the present invention using Windows XP®;

When operator A carries out a printing that uses a preview from the application 1, the user interface driver 3 activates a previewer 4 for the operator A session 601A. While the previewer 4 is displaying the preview image, the print processor 7 temporarily stops the printing process. If at this point an operator B attempts some kind of printing, the user interface driver 3 activates a status monitor 10 for the operator B session 601B. The status monitor 10 then communicates with the print processor 7 and acquires the status. The print processor 7 then provides a preview of the operator A printing process and the status monitor 10, which is now informed of the temporary stopping of the printing process, then displays a message to that effect in the operator B session 601B.

In the present embodiment as well, the status monitor 12 executes the steps shown in FIG. 2 and the print processor 7 executes the steps shown in FIGS. 8 and 9. As a result, by a technique identical to that of the third embodiment it is possible for the status monitor 12 of the session 601B of the operator B to display the fact that the print processor 7 is previewing and that printing has been halted.

Effects of the Fifth Embodiment

With the present embodiment, in an operating system that operates in multi-sessions as does Microsoft's Windows XP®, when operator B attempts to print while operator A is using the preview function, operator B is able to understand that printing does not proceed because the preview function is being used. Whereas conventionally operator B was unable to know the reason why printing was not progressing, the present embodiment makes it possible for the client B operator to know the reason by displaying a status. In response to the displayed status, the client B operator can choose an action such as waiting for the client A operator's preview to terminate, leading the client A operator to terminate the preview or canceling the client B operator's print job for that printer and issuing the print job to another printer.

[Variations on the Above-Described Embodiment]

A description will now be given of variations on the above-described embodiment of the present invention.

In all of the embodiments described above, when printing commences the status monitor may be activated in response to a status query from the operator without regard to printing, instead of being automatically activated from the user interface driver.

By so doing, the operator can use the status monitor to determine simply whether or not the printer is ready for printing, without regard to the presence or absence of a printing operation. As a result, the operator can preview the print job prior to printing, and from that preview determine whether or not to print the job. For this reason, a step of activating the print processor 7 whenever the print processor 7 receives a status monitor query is added to the routine depicted in FIGS. 2, 8 and 9, so that the print processor 7 can always respond to status queries from the status monitor 5. When the process starts from that point, the state of the print processor at that time is conveyed to the status monitor.

Moreover, in the event that a lack of resources at the host computer in terms of print processor capability causes the print processor 7 to be unable to process, if the print processor is equipped with a retry function that restarts processing after a certain period of time has elapsed then the print processor 7 will inform the status monitor 5 of the length of time until the next retry, thereby allowing the reason for the temporary halt in printing to be communicated to the operator.

Moreover, although in the above-described embodiments a temporary halt in the process of printing has been explained using the example of a preview, printing may be halted for any other reason as well, so long as that reason for the temporary halt in printing can be ascertained by the print processor. Halts in printing caused by the print processor can be accommodated by the configurations of the above-described embodiments, and the capabilities of the status monitor can be strengthened.

The present invention is not limited to the above embodiments and various changes and modifications can be made within the spirit and scope of the present invention. Therefore, to apprise the public of the scope of the present invention, the following claims are made.

What is claimed is:

1. A printing control system comprising:
   a previewer that is activated by a first session for a first operator when the first operator has input an instruction of printing with a preview function from an application;
   a print processor that, when a preview mode is not set, reads print data from a spool file, and causes a printer graphic driver to generate data to be supplied to a printer and that, when the preview mode is set, reads print data from a spool file, causes the printer graphic driver to generate bitmap data causes said previewer activated by the first session to display the generated bitmap data as a preview image, temporarily stops a printing process without sending print data to a downstream module until an operator inputs a command to begin printing while said previewer activated by the first session is displaying the preview image, and sends the print data to the downstream module when the command to begin printing is input by the operator in response to the preview image displayed by said previewer activated by the first session; and
   a status monitor that is activated by a second session for a second operator when the second operator has input an instruction of printing from an application, communicates with a printer to display a status of the printer based on information obtained from the printer, issues a status request to said print processor, and displays a status indicating that said print processor is displaying the preview image when said print processor has transmitted a status indicating that said print processor is displaying the preview image responsive to the status request,
   wherein, when said print processor receives a request from said status monitor activated by the second session before the operator inputs the command to begin printing in response to the preview image displayed by said previewer activated by the first session during displaying the preview image, said print processor informs said status monitor activated by the second session that the preview image is being displayed.

2. The system according to claim 1, further comprising the printer graphic driver that generates a bitmap image from a graphic command generated from the print data by a graphic device interface, wherein the bitmap image generated by said printer driver is supplied to the printer.

3. The system according to claim 1, wherein, when the second operator instructs to begin printing, said status monitor issues a status request to said print processor activated by the second session of the second operator, and, if said print processor sends a print job ID and a status indicating that said print processor is displaying the preview image to said status monitor in response to the status request, said status monitor displays the status indicating that said print processor is displaying the preview image for the relevant print job.

4. The system according to claim 1, wherein, when the second operator instructs to begin printing, said status monitor issues a status request to said print processor activated by the second session of the second operator, and, if said print processor sends a status indicating that said print processor is displaying the preview image to said status monitor in response to the status request, said status monitor displays a document name and the status indicating that said print processor is displaying the preview image.

5. A printing control method, comprising the steps of:
   by a print processor, when a preview mode is not set, reading print data from a spool file, and causing a printer graphic driver to generate data to be supplied to a printer, and when the preview mode is set, reading print data from a spool file, causing the printer graphic driver to generate bitmap data, causing a previewer activated by the first session to display the generated bitmap data as a preview image, temporarily stopping a printing process without sending print data to a downstream module until an operator inputs a command to begin printing while a previewer activated by the first session is displaying the preview image, and sending the print data to the downstream module when the command to begin printing is input by the operator in response to the preview image displayed by the previewer activated by the first session;

by a status monitor, communicating with a printer to display a status of the printer based on information obtained from the printer, and when the print processor has transmitted a status indicating that the print processor is displaying the preview image, issuing a status request to the print processor, and displaying a status indicating that said print processor is displaying the preview image, wherein the previewer is activated by a first computer for a first operator when the first operator has input an instruction of printing with a preview function from an application, and the status monitor is activated by a second computer for a second operator when the second operator has input an instruction of printing from an application, and wherein, when the print processor receives a request from the status monitor activated by the second session before the operator inputs the command to begin printing in response to the preview image displayed by the previewer activated by the first session during displaying the preview image, the print processor informs the status monitor activated by the second session that the preview image is being displayed.

6. The method according to claim 5, further comprising: a generation step of generating a bitmap image by the printer driver from a graphic command generated from the print data by a graphic device interface; and a supply step of supplying the bitmap image generated by the printer driver to the printer.

7. The method according to claim 5, wherein, when the second operator instructs to begin printing, the status monitor issues a status request to the print processor activated by the second session of the second operator, and, if the print processor sends a print job ID and a status indicating that the print processor is displaying the preview image to the status monitor in response to the status request, the status monitor displays the status indicating that the print processor is displaying the preview image for the relevant print job.

8. The method according to claim 5, wherein, when the second operator instructs to begin printing, the status monitor issues a status request to the print processor activated by the second session of the second operator, and, if the print processor sends a status indicating that the print processor is displaying the preview image to the status monitor in response to the status request, the status monitor displays a document name and the status indicating that the print processor is displaying the preview image.

9. A program stored in a computer-readable storage medium, for making a computer perform a printing control method, said program comprising:

a previewer module that is activated by a first session for a first operator when the first operator has input an instruction of printing with a preview function from an application;

a print processor module that, when a preview mode is not set, reads print data from a spool file, and causes a printer graphic driver to generate data to be supplied to a printer, and that, when the preview mode is set, reads print data from a spool file causes the printer graphic driver to generate bitmap data causes the previewer module activated by the first session to display the generated bitmap data as a preview image, temporarily stops a printing process without sending print data to a downstream module until an operator inputs a command to begin printing while the previewer module activated by the first session is displaying the preview image, and sends the print data to the downstream module when the command to begin printing is input by the operator in response to the preview image displayed by the previewer module activated by the first session; and a status monitor module that is activated by a second session for a second operator when the second operator has input an instruction of printing from an application, communicates with a printer to display a status of the printer issues a status request to the print processor module, and displays a status indicating that the print processor module is displaying the preview image when the print processor module has transmitted a status indicating that the print processor module is displaying the preview image responsive to the status request, wherein, when the print processor module receives a request from the status monitor module activated by the second session before the first operator inputs the command to begin printing in response to the preview image displayed by the previewer module activated by the first session during displaying the preview image, the print processor module informs the status monitor module activated by the second session that the preview image is being displayed.

10. A program according to claim 9, further comprising: generation-procedure code for generating a bitmap image by the printer driver from a graphic command generated from the print data by a graphic device interface; and supply-procedure code for supplying the bitmap image generated by the printer driver to the printer.

11. The program according to claim 9, wherein, when the second operator instructs to begin printing, the status monitor module issues a status request to the print processor module activated by the second session of the second operator, and, if the print processor module sends a print job ID and a status indicating that the print processor module is displaying the preview image to the status monitor module in response to the status request, the status monitor module displays the status indicating that the print processor module is displaying the preview image for the relevant print job.

12. The program according to claim 9, wherein, when the second operator instructs to begin printing, the status monitor module issues a status request to the print processor module activated by the second session of the second operator, and, if the print processor module sends a status indicating that the print processor module is displaying the preview image to the status monitor module in response to the status request, the status monitor module displays a document name and the status indicating that the print processor module is displaying the preview image.

13. A print control system, comprising:

a previewer, configured to be activated when printing using a preview function is triggered by an application;

a print processor, configured to, when a preview mode is not set, read print data from a spool file, and cause a printer graphic driver to generate data to be supplied to a printer, and, when the preview mode is set, read print data from a spool file, cause the printer graphic driver to generate bitmap data, cause said previewer to display the generated bitmap data as a preview image, and temporarily stop a printing process without sending print data to a downstream module until an operator inputs a command to begin printing while said previewer is displaying the preview image, and send the print data to the downstream module when the command to begin printing is input by the operator in response to the preview image displayed by said previewer; and a status monitor, configured to, when printing is triggered by the application, be activated, issue a status request to said print processor, and display a status indicating that said print processor is displaying the preview image when said print processor has transmitted a print job ID and a status indicating that the print processor is displaying the preview image responsive to the status request, wherein, when said print processor receives a request from said status monitor before the operator inputs the command to begin printing in response to the preview image displayed by said previewer during displaying the preview image, said print processor informs said status monitor that the preview image is being displayed.

14. A print control method, comprising the steps of:

by a print processor, when a preview mode is not set, reading print data from a spool file, and causing a printer graphic driver to generate data to be supplied to a printer, and, when the preview mode is set, reading print data from a spool file, causing the printer graphic driver to generate bitmap data, causing a previewer to display the generated bitmap data as a preview image, and temporarily stopping a printing process without sending print data to a downstream module until an operator inputs a command to begin printing while the previewer is displaying the preview image, and sending the print data to the downstream module when the command to begin printing is input by the operator in response to the preview image displayed by the previewer; and by a status monitor, when printing is triggered by the application, being activated, issuing a status request to the print processor, and displaying a status indicating that the print processor is displaying the preview image when the print processor has transmitted a print job ID and a status indicating that the print processor is displaying the preview image responsive to the status request, wherein, when the print processor receives a request from the status monitor before the operator inputs the command to begin printing in response to the preview image displayed by the previewer during displaying the preview image, the print processor informs the status monitor that the preview image is being displayed.

15. A program stored in a computer-readable storage medium, for making a computer perform a printing control method, said program comprising:

a previewer module, configured to be activated when printing using a preview function is triggered by an application;

a print processor module, configured to, when a preview mode is not set, read print data from a spool file, and cause a printer graphic driver to generate data to be supplied to a printer, and, when the preview mode is set, read print data from a spool file, cause the printer graphic driver to generate bitmap data, cause the previewer module to display the generated bitmap data as a preview image, and temporarily stop a printing process without sending print data to a downstream module until an operator inputs a command to begin printing while the previewer module is displaying the preview image, and send the print data to the downstream module when the command to begin printing is input by the operator in response to the preview image displayed by the previewer module; and a status monitor module, configured to, when printing is triggered by the application, be activated, issue a status request to the print processor module, and display a status indicating that the print processor module is displaying the preview image when the print processor module has transmitted a print job ID and a status indicating that the print processor module is displaying the preview image responsive to the status request, wherein, when the print processor module receives a request from the status monitor module before the first operator inputs the command to begin printing in response to the preview image displayed by the previewer module during displaying the preview image, the print processor module informs the status monitor module that the preview image is being displayed.

* * * * *